United States Patent [19]

Piatt et al.

[11] Patent Number: 4,725,857

[45] Date of Patent: Feb. 16, 1988

[54] COMPACT PRINTER/FEEDER HAVING SELECTABLE PRINT MEDIA MODES

[75] Inventors: Michael J. Piatt, Enon; James T. Theodoras, Xenia; Scott D. Lehman, Dayton, all of Ohio

[73] Assignee: Eastman Kodak Company, Rochester, N.Y.

[21] Appl. No.: 20,411

[22] Filed: Mar. 2, 1987

[51] Int. Cl.[4] ..................... G01D 15/24; G01D 15/26; B41J 11/50; B65H 3/44

[52] U.S. Cl. ........................................ 346/134; 271/9; 400/605; 400/624

[58] Field of Search .................... 271/9; 400/605, 624, 400/625; 346/134

[56] References Cited

U.S. PATENT DOCUMENTS

| | | | |
|---|---|---|---|
| 4,237,466 | 12/1980 | Scranton | 346/134 X |
| 4,341,480 | 7/1982 | Mailer | 400/625 |
| 4,360,279 | 11/1982 | Sugiura | 400/618 X |
| 4,449,705 | 5/1984 | Shibuya et al. | 271/9 |
| 4,662,765 | 5/1987 | Kapp et al. | 271/9 X |

*Primary Examiner*—E. A. Goldberg
*Assistant Examiner*—Patrick W. Foster
*Attorney, Agent, or Firm*—John D. Husser

[57] ABSTRACT

A print media handling system for a compact printer having a cut-sheet supply station formed in the lower portion of the printer housing and a rotatable print platen constructed and located to feed top sheets from the supply station through a print path ingress past a print zone and out a print path egress formed in the upper portion of the housing, includes (a) structure which mounts the supply station for movement to and from a sheet engaging relation with respect to the print platen and (b) a movable selection member that operates such movements of the supply station. The printer includes a supplemental inlet passage to the print path egress and the selection member includes structure for selectively blocking the supplemental inlet passage. The printer also includes a guide that is selectively positionable to alternatively direct egressing print media to either a sheet output zone or a continuous media output zone.

10 Claims, 11 Drawing Figures

COMPACT PRINTER/FEEDER HAVING SELECTABLE PRINT MEDIA MODES

BACKGROUND OF THE INVENTION

1. Field of the Invention

The present invention relates to compact line printers of the type having integral print media feeding and more particularly to constructions for enabling such printers to selectively handle either cut-sheet or continuous print media.

2. Background Art

With the increasing popularity of "personal" computers and word processors, there has developed a need for similarly "personal" printers of their output. To the extent that the computers and word processors become smaller in size and more portable, there is a commensurate desire that the output printers have the same characteristics. Various small size, dot matrix printers, which are capable of printing on cut-sheet, fanfold and tractor-feed media formats, are available. However, these printers generally require hand-insertion of each successive cut-sheet print medium.

Automatic sheet feeding accessories are available for use with such compact printers, but these devices are separate units from the printer and present several disadvantages. For example, these separate sheet feeders create bulk to the overall system, as well as making it aesthetically unpleasing. The separate feeder approach involves a separate motor, drive transmission and feed elements, causing it to be a costly system addition. Moreover, there must be separate umbilical lines coupling the printer and feeder, and "cords" are always a target for elimination.

From another viewpoint, the add-on sheet feeder approach requires troublesome operator activities when setting up the printing system and when changing between different types of print media, e.g. from discrete sheet to fanfold media. The add-on approach causes complexities in the sheet feed path, which can render the system subject to jams and misfeeds. Also from the functional viewpoint, the add-on approach requires an escape code from the host computer to initiate a sheet feed sequence. The use of this extra code is very inconvenient when utilizing some software packages, e.g. for word processing applications, that do not support such an extra code.

Concurrently filed U.S. application Ser. No. 20,416, entitled "Compact Printer Having An Integral Cut-Sheet Feeder" discloses a printer/feeder which eliminates or significantly reduces such disadvantages of the prior art devices. In general, that printer/feeder provides a transport member which serves to selectively feed face sheets from a supply stack housed within the printer, as well as to transport feed sheets sequentially along a print path including an ingress, print zone and egress. In a preferred embodiment, the transport member comprises a cylindrical platen especially sized and configured to cooperate with sheets and feed paths of predetermined dimension.

It is desirable for a compact printer such as described in the above-noted application to have the capability for handling continuous print media, e.g. tractor-fed media, in the event the operation or printing application favors this mode. However, sheet and continuous print media present different input/output handling requirements.

SUMMARY OF INVENTION

One important purpose of the present invention is to provide in a compact printer apparatus constructions which selectively dispose the printer in either a sheet feeding or a continuous media feeding mode.

In accord with one advantageous feature, the present invention provides such alternative print media modes in a compact configuration.

By another advantageous feature the present invention prevents insertion of continuous print media while the printer is disposed in a cut-sheet handling mode.

By another advantageous feature the present invention allows shifting into a continuous print media mode of operation without necessity of removing cut-sheet media from the printer supply station.

In accord with another advantageous feature, the present invention provides a simple mechanism for reliably disabling sheet feed by the printer and synchronously enabling the insertion of continuous print media.

Thus in one aspect, the present invention constitutes a compact printer having a housing, a cut-sheet supply station formed in the lower portion of the housing and a rotatable print platen constructed and located to feed top sheets from the supply station through a print path ingress past a print zone and out a print path egress formed in the upper portion of the housing, a print media handling system comprising: (a) means mounting the supply station for movement to and from a sheet engaging relation with respect to the print platen and (b) control means for selectively controlling the movement of the supply station.

In a related aspect the present invention provides a construction wherein the printer includes means forming an inlet passage from a location space from the supply station to the print path egress and wherein the control means includes means for selectively blocking the inlet passage.

In another related aspect of the present invention provides a construction wherein the printer includes guide means, selectively positionable proximate the print zone egress, for alternatively directing egressing print media to either a sheet output zone or a continuous media output zone.

BRIEF DESCRIPTION OF THE DRAWINGS

The subsequent description of preferred embodiments of the invention refers to the attached drawings wherein.

DETAILED DESCRIPTION OF PREFERRED EMBODIMENTS

Figure 1:
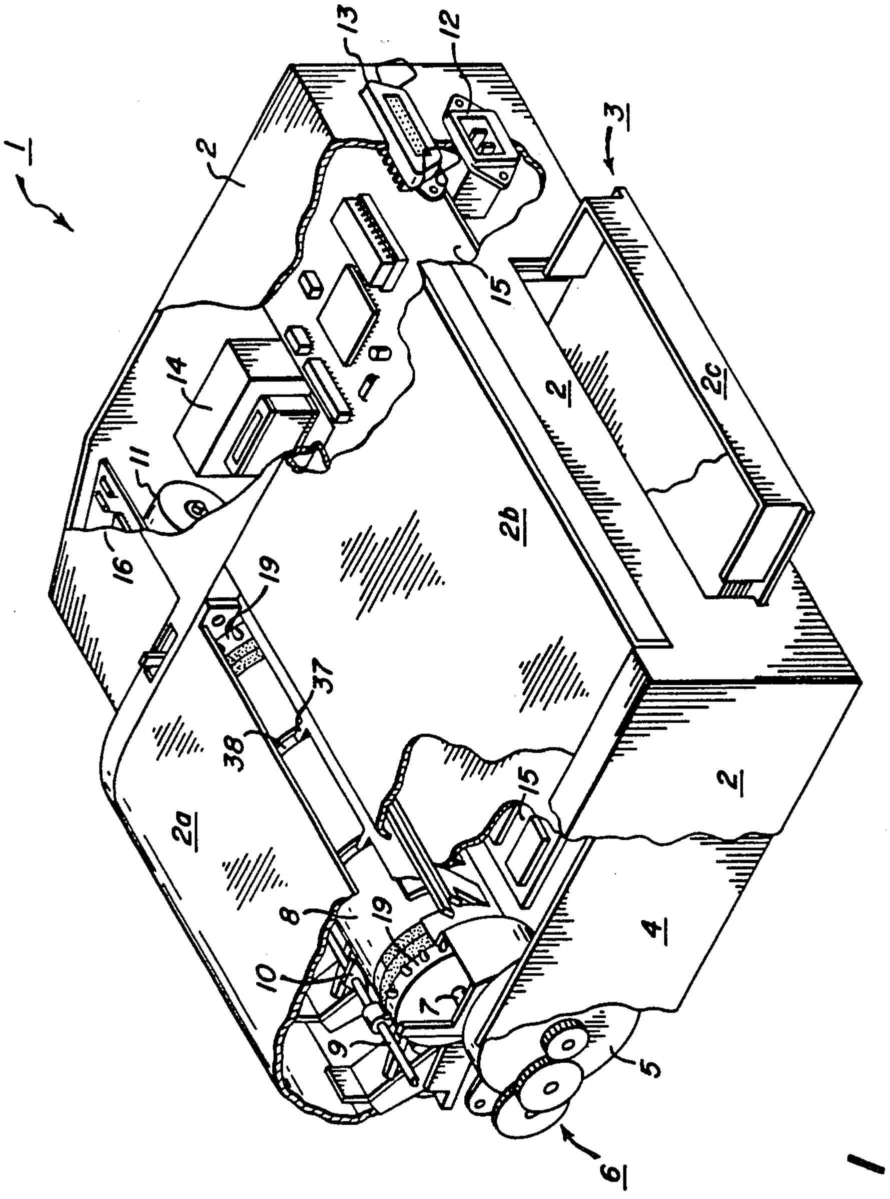
FIG. 1 is a perspective view, with portions broken away, showing one printer embodiment with which the present invention is useful.

The printer 1 shown in FIG. 1 is an embodiment of the present invention employing ink jet printing with insertable, drop-on-demand print/cartridges. While this printing technology is particularly useful for effecting the objects of the present invention, one skilled in the art will appreciate that many of the subsequently described inventive aspects will be useful in compact printers employing other printing approaches. The printer 1 has a housing 2, which encloses the operative printer mechanisms and electronics, and includes a pivotal front lid 2*a*, a pivotal rear lid 2*b* and a rear wall 2*c* of cassette drawer 3. Within the housing 2 is a main frame assembly (one wall 4 shown in FIG. 1) on which various components of the printer are mounted. Thus, a platen drive motor 5 is mounted to impart rotary drive through gear train 6 to a drive shaft 7 for a cylindrical platen 8 constructed in accord with one preferred embodiment of the invention, subsequently explained in more detail. Also mounted on the main frame assembly is a bail assembly 9 which is constructed to cooperate with platen 8 in accord with the present invention, as well as to support a print/cartridge carriage 10, which is shown in more detail in FIG. 2. Also shown in FIG. 1 are the printer's carriage drive motor 11, power and data input terminals 12, 13, power transformer means 14 and logic and control circuitry, which is disposed on one or more circuit boards 15. A control panel 16 for operator interface is disposed on the top front of the print housing.

Figure 2:
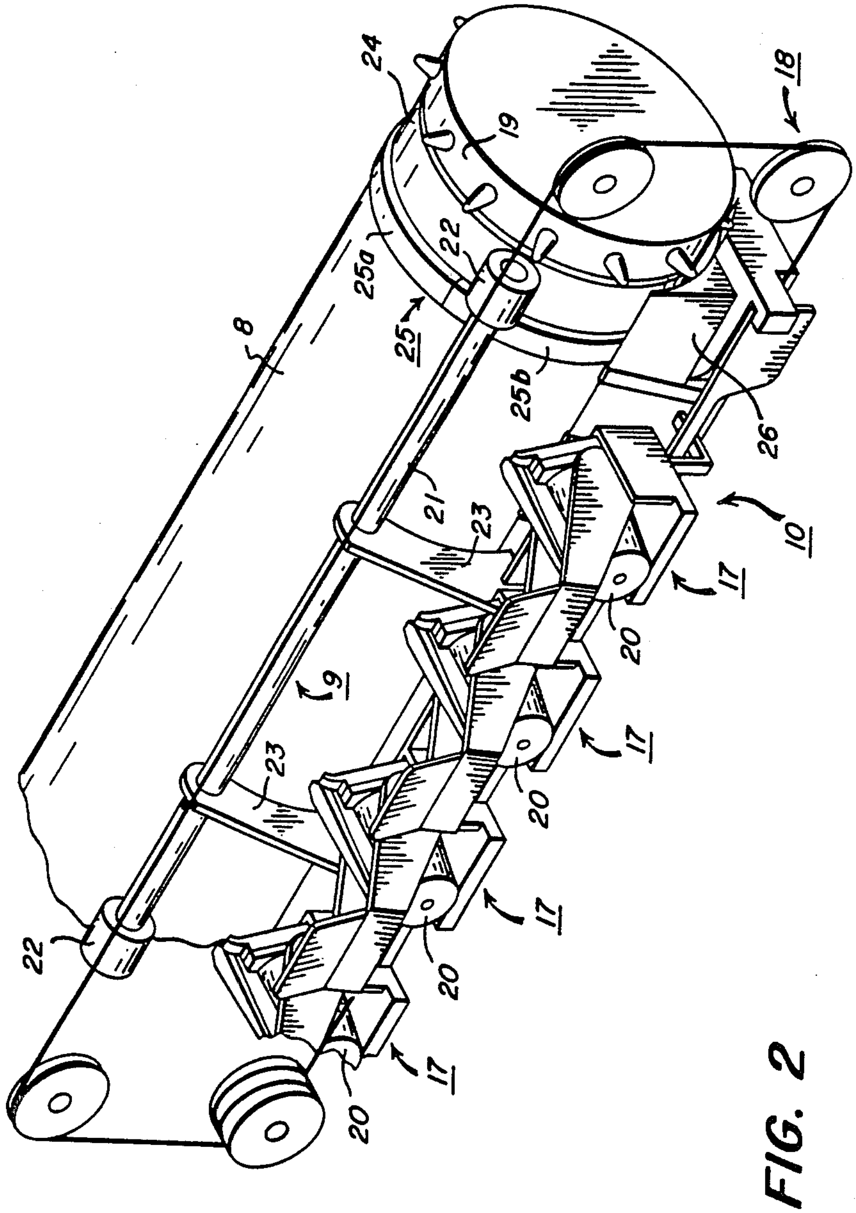
FIG. 2 is a perspective view, compressed in the axial dimension and having other portions exaggerated in scale to illustrate details of the print platen and print head carriage assembly of the FIG. 1 printer.

Referring to FIG. 2, the print/cartridge carriage 10 can be seen to comprise four nests 17 coupled for movement as a unit to translate across respective line segments of a print zone. Each of nests 17 is adapted to insertably receive, position and electrically couple a print/cartridge 20 in an operative condition within the printer. Such print/cartridges can be thermal drop-on-demand units that comprise an ink supply, a driver plate and an orifice array from which ink drops are selectively ejected toward the print zone in accord with data signals, e.g. transmitted through the printer logic from a data terminal such as a word processor unit. Both the print/cartridge construction and the positioning and coupling structures of nests 17 are described in more detail in U.S. application Ser. No. 945,134, filed Dec. 22, 1986, and entitled "Multiple Print/Cartridge Ink Jet Printer Having Accurate Vertical Interpositioning", by Piatt et al, which is incorporated herein by reference. However, other serial printing structures can be usefully employed in combination with the present invention. FIG. 2 also illustrates a carriage drive assembly 18, comprising a cable and pulley loop coupled to the motor 11 and to the carriage 10. Tractor feed wheels 19 mounted on the ends of platen 11 are used to advance tractor feed medium when printer 1 operates in that alternative printing mode.

Considering now the sheet feed constructions in accord with the present invention, the perspective illustration in FIG. 2 shows cooperative platen and carriage structures with non-scale sizes for more clear visualization of significant features. Specifically, platen and carriage assembly features have been axially compressed and the platen end features enlarged to show one preferred embodiment that enables platen rotation to effect the feeding of sheets from a supply stack, as well as transport of a fed sheet along the print path, from an ingress through the print zone and through a printer egress. Thus, the bail assembly 9 includes a shaft 21 which rotatably supports bail pressure rollers 22 near each end of the platen and which slidingly supports guide arms 23. As shown, the guide arms curve around the front platen periphery down into the zone of their attachment with other portions of carriage assembly 10. Axially inwardly from the tractor feed wheels at each end of the platen, there are constructed frictional transport bands 24, e.g. formed of a rubberized coating. Each of bands 24 extends around the entire platen periphery and is of substantially the same diameter as the platen 8. The frictional transport bands are respectively aligned with pressure rollers 22 so as to pinch paper therebetween in a manner that causes transmission of the platen rotation to a print sheet which has passed into their nip. Axially inwardly from each of transport bands 24 the platen comprises raised feed ring portions 25 that extend around the platen periphery. The feed ring portions extend above the platen surface, e.g. about 0.015", and each is divided into a rough surface sector 25*a* and a smooth surface sector 25*b*. The rough sectors of the two feed rings are at corresponding peripheral locations, as are their smooth sectors.

Also shown in FIG. 2 is a lower sheet guide member 26 which extends along the lower periphery of platen 8 from an ingress of the sheet feed path to a location contiguous the lower extensions of guide arms 23. Thus, portions 26 and 23 define means for guiding a fed sheet in close proximity to the platen 8, from the print path ingress into the nip of pressure roller 23.

Figure 3:
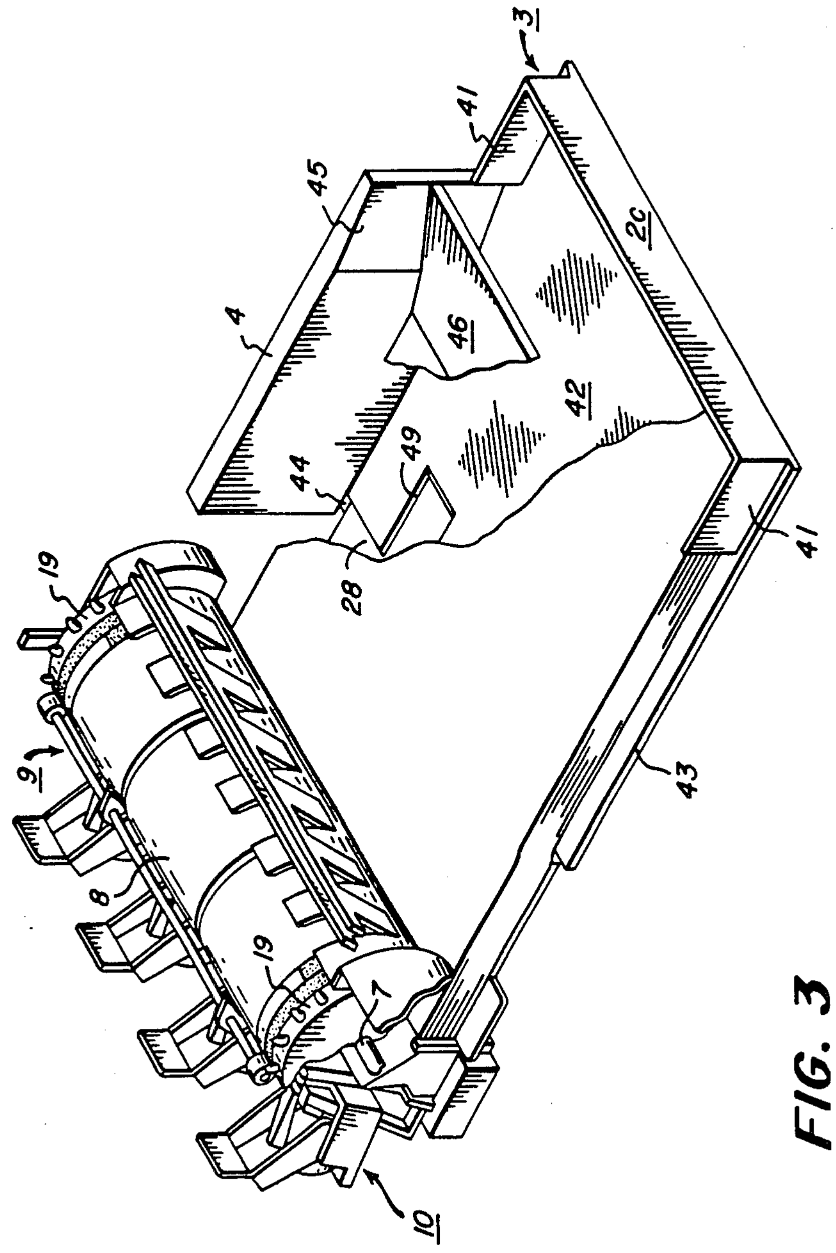
FIG. 3 is a perspective view of FIG. 1 printer portions, with housing removed, and showing one preferred embodiment of the present invention.

Referring back to FIG. 1, it can be seen that the cassette drawer 3 is slidably mounted in the bottom of the printer for movement between a withdrawn location (for the insertion of a stack of print sheets) and a stack positioning location. As shown in FIG. 3, the front end of the stack S positioned by cassette 3 rests on a force plate 28 which is pivotally mounted at its rear end for up-down movement and is biased upwardly by spring means 29. The leading stack edge is indexed against sheet index plate 30 and buckler members 31 (shown in more detail in FIG. 6). The functions of the structural elements described above will be further understood by considering the sheet feeding and printing sequences of the printer 1 with reference to FIGS. 4-A through 4-C. At the stage shown in FIG. 4-A, the platen 8 has been initialized to a start position. (This condition can be readily achieved by various means, e.g. depression of force plate 28, via its tab 28*a*, while indexing the platen to the FIG. 3 orientation by detection of a mark on the platen end by a photodetector not shown.) In this condition the leading edges of the rough surface sectors 25*a* of feed rings 25 are located at the contact point A with the top face sheet of a stack positioned by cassette 3. It is preferred that the contact zone Z be located slightly rearwardly from the front edges of the stack, as shown in FIG. 3, to facilitate buckling separation of the top sheet when sheet feed commences.

Figure 4A:
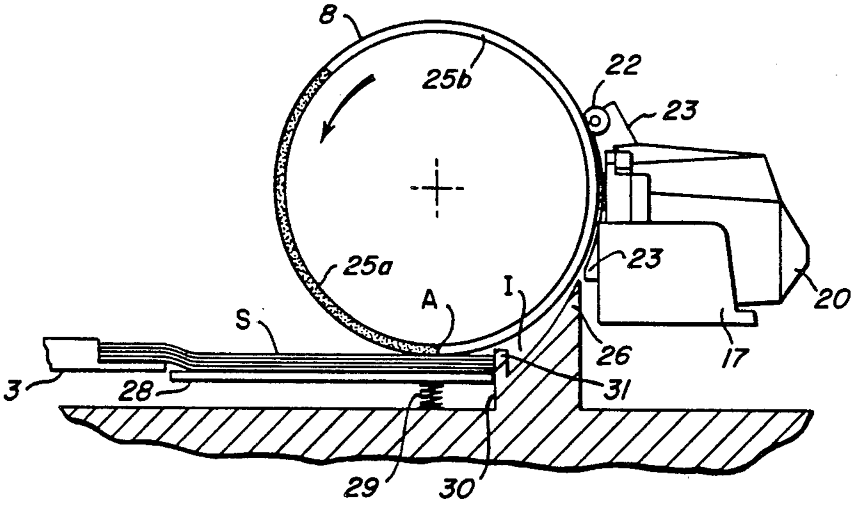
FIGS. 4-A through 4-C are a side view showing details of the sheet feed/transport platen of the FIG. 1 printer and its relation with the sheet supply station.
Figure 4B:
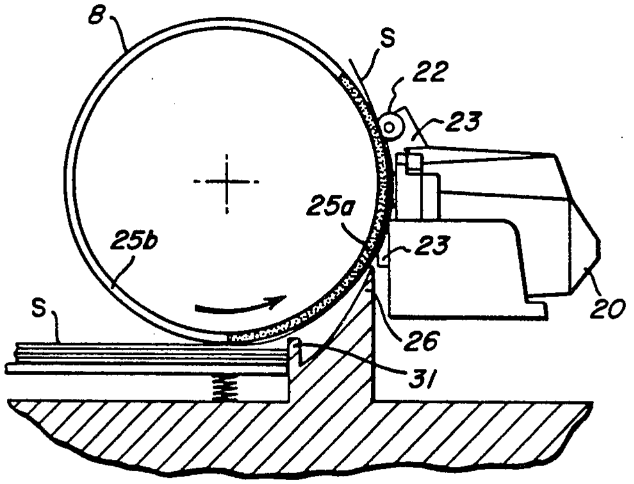
Figure 4C:
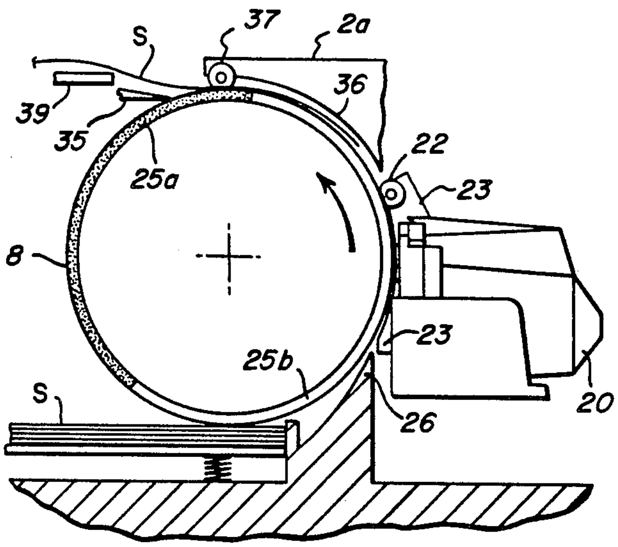

As the platen 8 rotates counterclockwise between the FIG. 4-A and FIG. 4-B conditions, the rough surface portions 25*a* force the top stack sheet into contact with, and over, buckler elements 31, into the print path ingress I. The sequential engagements at contact zone A between successive rough surface portions 25*a* and successive portions of the upwardly biased top sheet S drive the leading sheet edge along the print path defined by the guide means 26, 23 so that the leading edge of the sheet will move into the nip between pressure rollers 22 and transport bands 24. After the leading sheet edge has passed into the nip, the feed by rough surface portions 25*a* is no longer required and, as illustrated in FIG. 4, the smooth portions 25*b* can now exist at the contact zone. Feed of the print sheet continues to be provided by the rotation of the platen, now by virtue of the drive transmission at the nip of roller 22, as successive lines of information are printed by traversing print/cartridges 20.

In the system illustrated in FIGS. 4-A through 4-C, the drum makes two revolutions per sheet and, as shown in FIG. 4-C, toward the end of the second revolution, the trailing edge of a printed sheet S is egressing the nip of roller 22 and smooth portions 25*b* are still passing through the contact zone. Thus, the next successive top sheet is not yet fed from the stack. When the rotation of platen 8 progresses back to the stage shown in FIG. 3 (completing its second revolution), the trailing end of the fed sheet has passed pressure roller 22 and the next sheet feeding and transport sequence is initiated.

Figure 5:
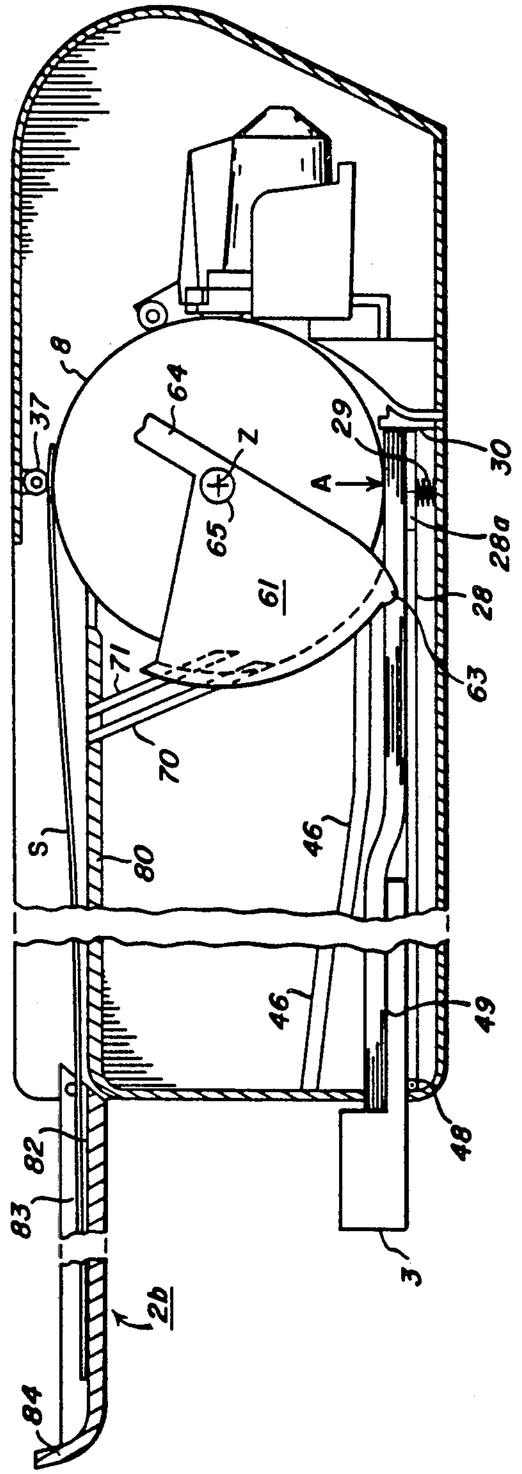
FIG. 5 is a schematic cross-sectional view of the FIG. 1 printer showing details of one embodiment of media selection construction in accord with the present invention, disposed in a sheet media mode.

As shown in FIG. 4-C, it is desirable for the housing top to embody guide structure 36 and additional pressure rollers 37, aligned with bands 24 so that a printed sheet is moved completely onto the output tray 39, revealed by opening lid 2b. This structure is pivotal away from the drum with front lid 2a to allow removal of a printed sheet if a job ceases at the FIG. 5 stage. As shown in FIG. 1 and FIG. 5, stripper fingers 37 are disposed within recesses 38 of platen 8 to assist in directing a sheet into the output tray when a series of sheets are printed successively. Further details of the feeder/-transport system described above are set forth in the aforecited Ser. No. 20,416, which is incorporated herein by reference by those teachings. It will be appreciated that such construction provides a compact and mechanically simple system for feeding and transporting sheets in the printer.

Referring now to FIGS. 3 and 5, the structural and functional details of the sheet supply station in accord with the present invention will be described. Thus, cassette drawer 3 includes drawer face 2*c*, partial side walls 41 and bottom wall 42 which are constructed to receive and support the rear sector of a sheet stack for use in the printer. The drawer 3 is supported for sliding movement in the lower rear of the printer housing by the interfitting of the side flanges 43 in grooves 44 of the main frame 4 of the printer. The drawer 3 is movable between three functional positions, viz.: (i) a storage or carrying position wherein face 2*c* is flush with rear wall 2 of the printer, (ii) a stack inserting position, more fully withdrawn than shown in FIGS. 1 and 3 and (iii) a stack indexing position as shown in FIGS. 1, 3 and 5.

Figure 6:
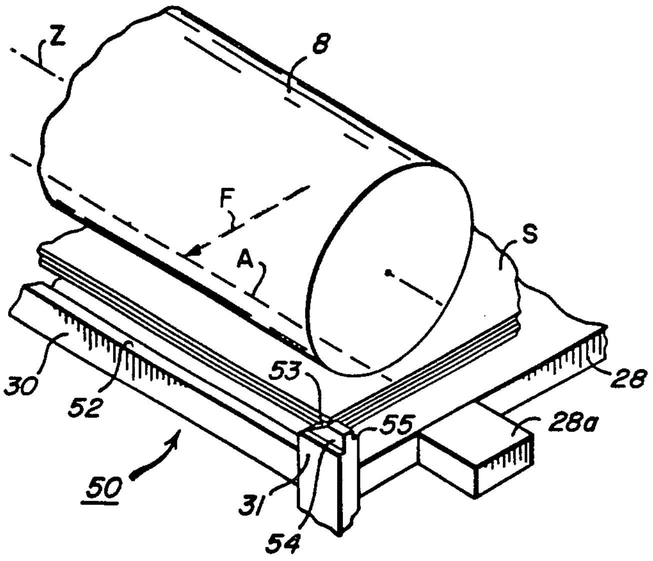
FIG. 6 is a schematic perspective view of an interior portion of the FIG. 1 printer device showing portions of the feed/transport platen and sheet supply station.

Referring to FIG. 3, the rear portions of the two side walls (one not shown) of main frame 4 have formed thereon slanted end surfaces 45 which constitute side guides for centering an inserted sheet stack with respect to the feed and transport paths of the printer 1. Above the interior path of cassette drawer 3 is a top guide wall 46 having a downwardly slanted first portion adapted to direct sheet stacks downwardly onto the force plate 28 as they move into their indexed position. As best shown in FIGS. 5 and 6, an index plate 30 is located along the path of an inserted sheet stack, forwardly within the printer of the contact zone A (between the face sheet of an inserted stack and platen 8).

It is preferred that force plate 28 move toward the contact zone A so as to be generally tangential to the periphery of platen 8 at the line of contact between top stack sheets and platen 8. For that purpose the force plate 28 is coupled to the main frame 4 at the rear of the printer by hinge 48. To avoid contact between the upward movement of force plate 28 and the bottom wall 42 of cassette drawer 3, the forward portions of wall 42 have comb-like notches 49 and the rearward portions of the force plate have interfitting notches (not shown).

Considering now the operation of sheet stack insertion, the cassette drawer is first withdrawn to its fully extended position and the front end of a stack (e.g. about 150 sheets of 8-½"×11" paper) is inserted into the opening formed by side guides 41 and top guide 46. When the stack has been sufficiently inserted so that its trailing end will rest on bottom wall 42 inside drawer face 2*c*, the cassette drawer 3 is moved to the stack indexing position shown in FIGS. 1, 3 and 5. Thus, drawer wall 2*c* will move the front end of sheet stack S beneath the platen 8 and into abutment with index wall 30. At this stage spring 29 will be urging the top and successive stack sheets into engagement with the periphery of platen 8.

Referring to FIG. 6, there is shown a portion of a preferred sheet separator construction which is especially suited for use in cooperation with the sheet feed system described above. Thus, the sheet feeding and buckler device 50 comprises stack index plate 30 having a plate 51 precisely parallel to axis Z of platen and two opposing sheet buckler posts 31 located to form a channel through which the top stack sheet can pass when its leading edges buckle inwardly. The specific details of this sheet separator system are described in concurrently filed U.S. application Ser. No. 20,409, entitled "Compact Printer with Cassette-Drawer Sheet Feeder" by M. Piatt et al, which is incorporated herein by reference for those teachings. When the force plate 28 is in the upward, sheet feed position shown in FIGS. 5 and 6, rotation of the platen effects sequential sheet feed from stack S as described with respect to FIGS. 4-A to 4-C.

In accord with the present invention, the printer 1 has a print-media selection construction which allows an operator to switch between the sheet printing mode described above and a continuous print media mode, e.g. with continuous, tractor-feed media. As will be understood from the subsequent description, this print mode selection construction provides the advantage that it is not necessary to remove sheet media from the printer cassette-drawer in order to operate with continuous print media. Also, the construction is advantageous in that the operator is inhibited from inserting continuous web media when the printer is in the sheet feed selection mode.

Figure 7:
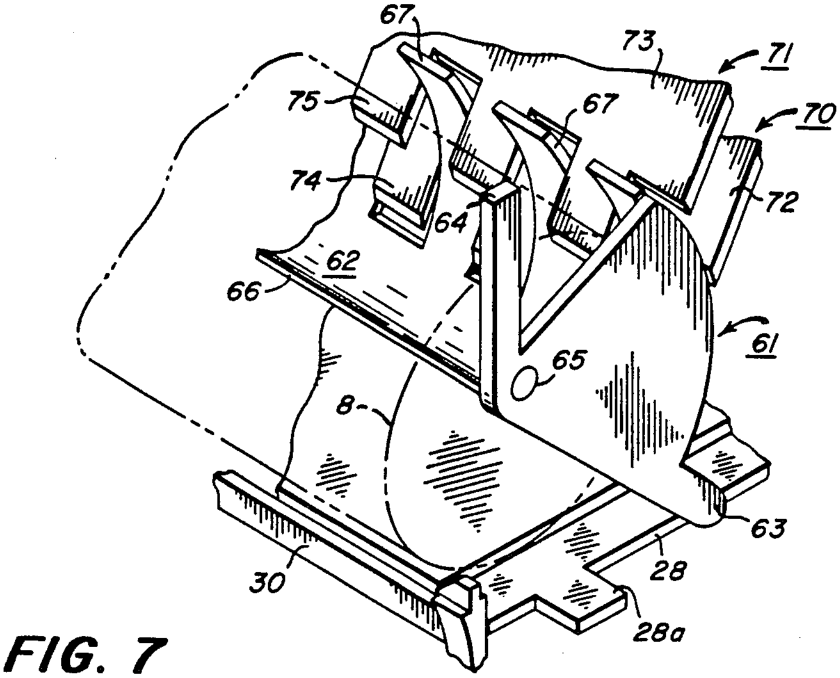
FIGS. 7 and 8 are perspective views showing operational mode selection structures of the FIG. 1 printer respectively in sheet feed and continuous feed orientations.
Figure 8:
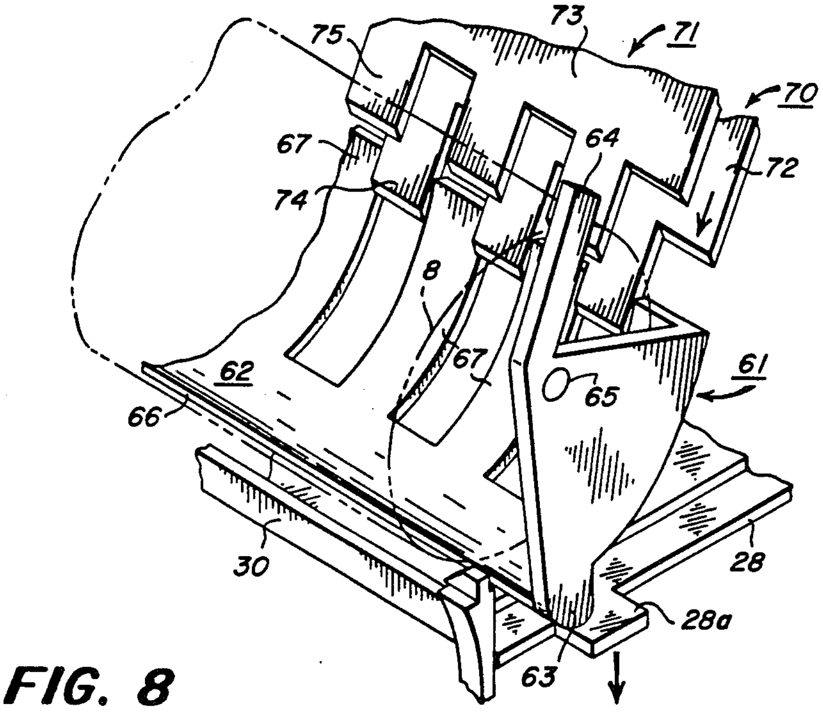
Figure 9:
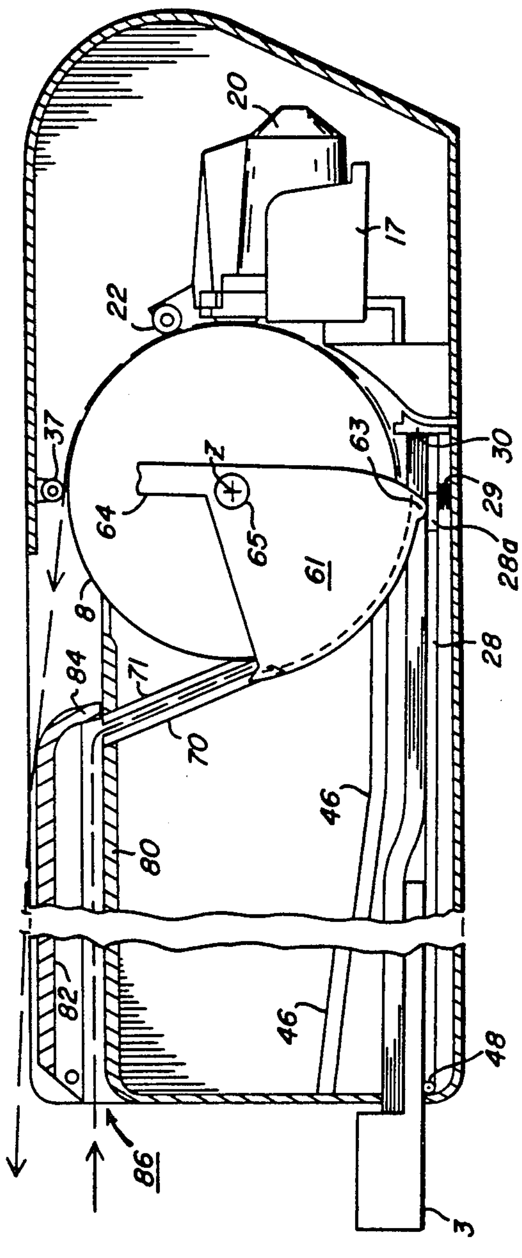
FIG. 9 is a side view like FIG. 5, but with the printer selection structure in continuous feed orientation.

The details of one preferred embodiment of mode selection construction in accord with the present invention can be seen most clearly by referring to FIGS. 5 and 7–9. Thus, FIGS. 5 and 7 show the mode selection construction in the sheet media orientation and FIGS. 8 and 9 show that construction in the continuous media orientation. More particularly it can be seen that the printer 1 includes a selection lever 60 that has end portions 61 adjacent each end of platen 8 and a central portion 62 that extends around the rear portion of the platen rotation path. The end portions 61 (only one shown) each include a cam portion 63, an actuating lever portion 64 and a journal portion 65 which mounts the lever 60 for rotation about the axis Z of platen 8. As best seen in FIGS. 7 and 8, the central portion 62 has a comb-like profile with a guide lip 66 and guide teeth 67. FIGS. 7 and 8 also show how the central portion 62 of lever 60 cooperates with a pair of continuous media input guide plates 70 and 71. Thus guide plates 70, 71 also have a comb-like profile with inlet lip portions 72, 73 and teeth portions 74, 75 that are sized and located to interfit with teeth portions 63 of lever 60.

The purposes of the constructions just described will be understood by considering their functions in each of the print media selection orientations. Thus, when the actuator arm 64 of mode selector lever 60 is moved toward the front of the printer to its sheet media position as shown in FIGS. 5 and 7, two operational conditions are effected. First, the cam portions 63 of lever 60 are moved out of contact with tab portions 28a of force plate 28. This allows spring 29 to move the force plate upwardly so that the sheet stack S supported thereon is moved to contact the feed/transport platen 8. This enables the sequential feeding of top sheets from the stack as already described. Second, the forward movement of the actuator arm 64 moves the teeth portions 67 of the central lever portion into a position that blocks the passage for continuous web ingress, i.e. between inlet guide plates 70, 71 as shown in FIG. 7. This prevents inadvertent jamming that would be incident to an operator feeding continuous print media into the printer when the sheet feed system is in an operative condition.

Now consider the function of these mode selector constructions when the actuator arm is moved rearward into continuous mode condition shown in FIGS. 8 and 9. In this condition cam portion 63 of lever 60 has, via tab 28*a*, moved force plate 28 to its lower condition so that its supported stack does not engage platen 8. Moreover, the stack is lowered to an extent that opens a continuous web inlet path over the top of the now-lowered sheet stack. In addition the guide lip portion 62 of lever 60 is moved to a location proximate the print path ingress, so that a continuous web introduced between guide plates 70, 71 is now guided around the lower rear of the platen by the central lever portion and over the index plate 30. Note, the teeth portions 67 no longer block the continuous web inlet path, but now form an extension of the inlet guide from teeth 74 around the lower rear of the platen 8. Thus it will be appreciated that a continuous web print media can be fed into its operative path, engage with tractor-feed portions 19 of platen 8 and continuous media printing can progress, all without removal of the sheet stack S from the printer. FIG. 9 shows one preferred embodiment of the continuous print media egress path which is described in more detail in concurrently filed U.S. Ser. No. 20,410, entitled "Compact Printer Having Convertible Discharge Hopper" by Piatt et al, which is incorporated herein by reference.

While the disclosed embodiments of the present invention describe simplified constructions and methods for control of the platen indexing and feed sequencing, more complete control systems useful with the present invention are described in concurrently filed U.S. application Ser. No. 20,425, entitled "Printer/Feeder Having Integral Control System" by Piatt et al, which is incorporated herein by reference.

The invention has been described in detail with particular reference to preferred embodiments thereof, but it will be understood that variations and modifications can be effected within the spirit and scope of the invention.

We claim:

1. In a compact printer having a housing, a cut-sheet supply station formed in the lower portion of said housing and a rotatable print platen constructed and located to feed top sheets from said supply station through a print path ingress past a print zone and out a print path egress formed in the upper portion of said housing, a print media handling system comprising:

(a) means mounting said supply station for movement to and from a sheet engaging relation with respect to said print platen; and (b) control means for selectively controlling the movement of said supply station.

2. The invention defined in claim 1 wherein said control means includes spring means for urging said supply station toward its sheet engaging relation with said print platen and cam means for selectively moving said supply station away from said sheet engaging relation against the force of said spring means.

3. The invention defined in claim 1 wherein said printer includes means forming an inlet passage from a location space from said supply station to said print path egress and wherein said control means includes means for selectively blocking said inlet passage.

4. The invention defined in claim 3 wherein said control means includes a cam member for moving said supply station and a blocking member, synchronously movable with said cam member, for blocking said inlet passage when said supply station is in sheet engaging relation vis-a-vis said platen and opening said inlet passage when said supply station is away from said sheet engaging relation vis-a-vis said platen.

5. The invention defined in claim 1 wherein (i) said control means includes spring means for urging said supply station toward its sheet engaging relation with said print platen and cam means for selectively moving said supply station away from said sheet engaging relation against the force of said spring means and (ii) said printer includes means forming an inlet passage from a location space from said supply station to said print path egress and wherein said control means includes means for selectively blocking said inlet passage.

6. The invention defined in claim 5 wherein said blocking means and said cam means are portions of an integral selection member.

7. The invention defined in claim 6 wherein said selection member comprises a lever arm extending through said printer housing for operator access.

8. The invention defined in claim 3 wherein said printer includes guide means, selectively positionable proximate said print zone egress, for alternatively directing egressing print media to either a sheet output zone or a continuous media output zone.

9. The invention defined in claim 8 wherein said guide means is coupled to said control means.

10. The invention defined in claim 9 wherein said guide means comprises a lid member pivotally mounted over a sheet output zone and wherein pivotal movement of said lid member to uncover said sheet output zone actuates: (i) movement of said supply station to said sheet engaging relation and (ii) movement of said blocking member to said blocking position.

* * * * *